United States Patent [19]

Habermann et al.

[11] Patent Number: 4,466,867
[45] Date of Patent: Aug. 21, 1984

[54] PRODUCTION OF BLUE IRON HEXACYANOFERRATE-III PIGMENTS

[75] Inventors: Wolfgang Habermann, Mainz; Peter Hammes, Ruppertsberg; Joachim Felger, Walheim; Karl-Ludwig Hock, Ludwigshafen-Ruchheim; Friedrich Brunnmueller, Ludwigshafen; Helmut Knittel, Ludwigsburg; Joachim Kranz, Ludwigshafen; Rolf Schneider, Mannheim; Peter Thoma, Frankenthal, all of Fed. Rep. of Germany

[73] Assignee: BASF Aktiengesellschaft, Ludwigshafen, Fed. Rep. of Germany

[21] Appl. No.: 467,744

[22] Filed: Feb. 18, 1983

[30] Foreign Application Priority Data

Feb. 25, 1982 [DE] Fed. Rep. of Germany ....... 3206663

[51] Int. Cl.³ .............................................. C25B 1/00
[52] U.S. Cl. .................................. 204/91; 204/59 R; 204/180 P
[58] Field of Search ................................ 204/59 R, 91

[56] References Cited

U.S. PATENT DOCUMENTS 2,273,798  2/1942  Heise et al. ........................... 204/91
2,353,782  7/1944  Neumark ............................... 204/91
4,032,415  6/1977  Sanders ................................. 204/91
4,178,218  12/1979  Seko ..................................... 204/296

FOREIGN PATENT DOCUMENTS 697606  11/1979  U.S.S.R. .............................. 204/91

Primary Examiner—T. Tung
Attorney, Agent, or Firm—Oblon, Fisher, Spivak, McClelland & Maier

[57] ABSTRACT

Blue iron hexacyanoferrate-III pigments are produced by a process wherein complex iron-II hexacyanoferrate-II (Berlin white) is prepared by electrolysis of an aqueous catholyte solution containing (a) an iron-II salt, (b) an alkali metal salt, an ammonium salt or a mixture of these, and (c) hydrogen cyanide, in an electrolysis cell in which the anode chamber and cathode chamber are separated by an ion exchange membrane, using an electrically conductive aqueous liquid in the anode chamber, and the iron-II hexacyanoferrate-II obtained is then converted to the blue pigment.

The process gives Berlin white, which is substantially free from salt, in high yield and high purity. Pollution caused by the process is very low, since only a small amount of salt is produced. Compared with the corresponding blue pigments produced by prior art processes, the pigments obtained give purer colorations with better gloss, and are of higher color strength.

19 Claims, No Drawings

PRODUCTION OF BLUE IRON HEXACYANOFERRATE-III PIGMENTS

The present invention relates to a process for the production of blue iron hexacyanoferrate-III pigments.

Blue iron hexacyanoferrate-III pigments (I) (C.I. Pigment Blue 27; C.I. No. 77,510) are commercially available under various names, such as Prussian blue, Berlin blue, Milori blue or Iron blue.

These blue pigments are obtained by oxidizing complex iron-II hexacyanoferrate-II compounds, which are also called Berlin white (II), with an oxidizing agent in dilute acid, such as chlorate/hydrochloric acid, or dichromate or air in dilute sulfuric acid.

The chemical composition of Berlin white (II) and the blue iron hexacyanoferrate-III pigments (I) is complex, and within certain limits also depends on the production process. In the text which follows, II is represented by the (simplified) formula $$M_2Fe[Fe(CN)_6] \tag{II}$$

and the blue pigments are represented by $$MFe[Fe(CN)_6] \tag{I}$$

where M is an alkali metal cation, preferably a potassium or sodium ion, an ammonium ion or a mixture of these cations. Any water or crystallization which may be present is not taken into account in the formula.

Regarding the chemical composition of the compounds, reference may be made to H. Kittel, "Pigmente", Wissenschaftliche Verlagsgesellschaft mbH, Stuttgart, 1960, page 341/343, and the literature quoted therein.

In the prior art processes, the iron-II hexacyanoferrate-II (II) is prepared by precipitating iron-II salts with complex alkali metal hexacyanoferrates-II in aqueous solution. As much as 2 parts by weight of alkali metal salts are obtained per part by weight of Berlin white (II), which means substantial pollution of the effluent. Another disadvantage of the prior art process is that the salts contained in (II) must be partially washed out in a very time consuming operation before the oxidation to I. This is also the case if the Berlin white is prepared by reacting freshly precipitated iron-II oxide with hydrogen cyanide in an alkaline medium, or by reacting iron-II salts with hydrogen cyanide in the presence of an alkali metal hydroxide or ammonia at pH>4.

It is an object of the present invention to provide a non-polluting process of low technical complexity for the production of blue iron hexacyanoferrate-III pigments. In particular, it has been desirable to develop a non-polluting process for the preparation iron-II hexacyanoferrate-II which does not have the disadvantages of the prior art process.

We have found that this object is achieved, and that blue iron hexacyanoferrate-III pigments are obtained, if iron-II hexacyanoferrate-II (Berlin white) is prepared, in an electrolysis cell whose anode chamber and cathode chamber are separated by an ion exchange membrane, by electrolysis of an aqueous solution containing (a) an iron-II salt, (b) an alkali metal salt, an ammonium salt or a mixture of these, and (c) hydrogen cyanide, at a pH of from 0.5 to 6 as catholyte in the cathode chamber, and of an electrically conductive, aqueous solution in the anode chamber, the iron-II hexacyanoferrate-II is oxidized to the iron hexacyanoferrate-III pigment, and the latter is isolated.

A high yield of highly pure complex iron-II hexacyanoferrate-II (II) is obtained by the process according to the present invention. Pollution caused by the process is very low, since the cathode liquid (catholyte) has a low salt content as a result of using the ion exchange membrane, and can therefore be re-used after replacement of the iron-II salt, alkali metal salt and/or ammonium salt and hydrogen cyanide consumed.

It is surprising that an iron-II salt, hydrogen cyanide and an alkali metal salt and/or ammonium salt are converted virtually quantitatively to iron-II hexacyanoferrate-II, at a cathodically polarized electrode in an acidic aqueous medium.

In comparison, the prior art process gives the complex (II) quantitatively only at pH>8, or by anodic dissolution of metallic iron in an electrolyte containing a potassium salt and hydrogen cyanide.

The process is carried out using an electrolysis cell in which the anode chamber and the cathode chamber are separated from one another by an ion exchange membrane. Cells of this type are known.

The anode chamber contains an aqueous solution (anolyte) which possesses good electrical conductivity. A suitable partition is an anion exchange membrane or a cation exchange membrane. The composition of the anolyte depends on the ion exchange membrane used, and on any electrochemical reaction taking place in the anolyte.

When a cation exchange membrane is used, preferred anolytes are aqueous mineral acids, e.g. sulfuric acid or phosphoric acid, with or without salts whose cations are transferred, during electrolysis, to the cathode chamber and hence into the catholyte, and are incorporated into the resulting iron-II hexacyanoferrate-II during electrolysis of the catholyte. These salts are also called doping salts, and examples of these are alkali metal, ammonium, iron and nickel salts, or mixtures of these.

The advantage of using doping salts in the anolyte is that the concentration of these cations in the catholyte can be kept small, since the amounts precipitated with or incorporated in the Berlin white (II) are replenished continuously during electrolysis, by passage from the anolyte to the catholyte. As a result of the low salt concentration in the catholyte, the iron-II hexacyanoferrate-II (II) obtained has a very low salt content.

If an anion exchange membrane is used for separating the anode chamber from the cathode chamber, an aqueous mineral acid, e.g. sulfuric acid, is preferably employed as the anolyte. Oxygen is formed at the anode during electrolysis, and can be recovered. At the same time, the sulfuric acid concentration is increased, and may become as high as 50% strength by weight of sulfuric acid.

It is also possible to use a solution of an alkali metal hydroxide or of a salt as the anolyte. In this manner it is possible to convert chlorides to chlorates or perchlorates, or sulfates to peroxydisulfates, these compounds being obtained as coupling products at the anode during electrolysis.

An aqueous solution containing (a) an iron-II salt, (b) an alkali metal salt and/or an ammonium salt and (c) hydrogen cyanide is used as the catholyte for the process according to the present invention.

Advantageously, not less than the stoichiometric amounts of (a), (b) and (c) should be used in the catholyte. Accordingly, as a rule not less than 1, preferably from 1.3 to 2.5, equivalents of (b) and not less than 6, preferably from 6.1 to 7.5, moles of hydrogen cyanide (c) are employed per 2 moles (4 equivalents) of (a).

It is also possible to use larger amounts of (a) or of (b) and/or (c), but this is of no advantage for the reaction, and has the disadvantage that the precipitated Berlin white (II) has a higher content of (a) or of (b) (which has to be removed), or special safety measures have to be taken when isolating (II) owing to the substantial amount of (c) present, or the excess of (c) is lost when (II) is being isolated or directly processed further.

The reaction to give (II) can be carried out by electrolyzing the catholyte which contains (a), (b) and (c) in the amounts required for the reaction.

However, it is also possible to carry out the process as follows: one, two or all three of the components are metered into the catholyte, during electrolysis, at the rate at which conversion to (II) takes place, so that the same concentration of (a), (b) and/or (c) are always maintained in the catholyte. However, the total amounts of (a), (b) and (c) preferably correspond to the above ratio. The latter procedure has the advantage that the synthesis of (II) takes place under steady-state or substantially steady-state conditions, and the product is formed under uniform conditions.

The electrolysis is carried out at a pH of from 0.5 to 6, preferably from 2 to 4, and in particular from 2.5 to 3.5. The desired pH of the solution is established before electrolysis, and maintained during electrolysis if necessary, by adding dilute acid or dilute aqueous alkali metal hydroxide, carbonate or acetate, ammonia water and/or iron carbonate. At the beginning of electrolysis, the pH of the catholyte may even be somewhat higher, for example as high as 8. When electrolysis begins, the pH drops rapidly to 6 and below.

Furthermore, it has proven advantageous for the catholyte to be free of atmospheric oxygen, so that premature oxidation of (II) does not occur. For this purpose, a small amount of reducing agent, for example sulfur dioxide or a sulfite, may be added to the catholyte.

Since the conductivity of the electrolyte is temperature-dependent and increases with increasing temperature, it is advantageous to carry out the process at from 0° to 100° C., preferably from 20° to 60° C. Owing to the low boiling point of the hydrogen cyanide, at above 50° it may be necessary to carry out the electrolysis in a closed system or under superatmospheric pressure in order to avoid less of hydrogen cyanide.

Suitable iron-II salts (a) are those which are soluble in water in the concentration employed or are dissolved under the conditions of the reaction, and whose anions do not interfere with the electrolysis. The same applies to the alkali metal and ammonium salts (b).

Particularly suitable compounds (a) and (b) are the sulfates, the chlorides, the nitrates and the acetates, as well as double salts of (a) and (b).

It is also possible to use the corresponding carbonates or hydroxides as donors of alkali metal ions or ammonium ions, provided that the pH of the catholyte is kept within the above range.

Specific examples are:
(a) Iron-II chloride, and in particular iron-II sulfate, and
(b) the sulfate, hydrogen sulfate, chloride, nitrate, acetate, carbonate or hydroxide of sodium, potassium, lithium, rubidium, cesium or ammonium, or mixtures of these.

Preferably, (a) and (b) are chlorides, hydrogen sulfates or sulfates, or mixtures of these.

The current density during electrolysis is in general $>0.5$ kA/m$^2$, preferably from 1.5 to 4 kA/m$^2$, in order to achieve a high space/time yield.

The process can be carried out batchwise or continuously. If it is carried out batchwise, the concentration of hydrogen cyanide in the catholyte should desirably be from 0.2 to 15% by weight, based on the solution (catholyte). Electrolysis is advantageously carried out until the residual iron content of the solution is $\leq 500$ ppm.

The concentration of the iron-II salt in the catholyte is as a rule from 0.1 to 20% by weight, and accordingly the content of the alkali metal salt and/or ammonium salt in the catholyte is then in general from 0.1 to 10% by weight, based on the solution. The concentrations apply to solutions before electrolysis.

When the process is carried out continuously, the concentration of hydrogen cyanide is advantageously from 0.5 to 10% by weight, based on the solution. In this case, electrolysis should be carried out so that the concentration of hydrogen cyanide does not fall below 0.1% by weight, preferably not below 0.3% by weight, based on the catholyte.

The iron-II hexacyanoferrate-II (II) formed can be isolated from the catholyte, for example by filtration or centrifuging. After the amounts consumed have been replenished, the filtrate can be re-used.

It is also possible to work up the suspension formed during electrolysis directly to give the blue pigment.

It is particularly advantageous to use an anion exchange membrane to separate the anode chamber from the cathode chamber. Because, in this case, the anions liberated during the reaction are transferred from the cathode chamber to the anode chamber, there is no build-up in the concentration of a salt in the catholyte, so that there is no need to subject the catholyte to a special regeneration procedure or to wash the product II. The catholyte can be re-used after the constituents consumed have been replaced, or can be discarded. During electrolysis, it is possible either to build up the concentration of sulfuric acid in the anolyte, or to prepare a chlorate, perchlorate or peroxydisulfate therein.

Suitable cathodes are those composed of inert materials having a low hydrogen overvoltage, for example stainless steels, chromium/nickel steels, nickel, cobalt, molybdenum, tungsten, molybdenum/iron alloys or tungsten/iron alloys, or cathodes coated with tungsten, tungsten/iron/nickel alloys, iron/nickel alloys or iron/cobalt alloys (in each case having an iron content of from 65 to 95% by weight, German Laid-Open Application DOS No. 3,003,819), or with vanadium, vanadium alloys or sulfides of molybdenum, tungsten, nickel or cobalt.

Suitable anode materials are, for example, titanium, tantalum an niobium, doped or coated with platinum metals, platinum metal oxides, platinates or lead dioxide. The anode may also be composed of graphite or magnetite.

Suitable ion exchange membranes are the commercially available ones. They can have a homogeneous or heterogeneous structure, preferred examples being those based on homopolymers, or where relevant copolymers, of styrene, styrene with divinylbenzene, vinyl chloride with acrylonitrile, olefins, perfluorinated olefins or perchlorinated olefins, which have quaternary ammonium, sulfonic acid or carboxyl groups as charge-carrying groups.

Oxidation of the complex iron-II cyano compound (II) obtained by electrolysis is carried out in a conventional manner, for example with a chlorate, chlorine, a peroxydisulfate or hydrogen peroxide in an aqueous suspension at pH<6, in particular from 2.5 to 0, and at from 20° to 100° C.

Preferably, the oxidation of the Berlin white II obtained by the process according to the invention is carried out in aqueous sulfuric acid suspension at pH 0-3 and at from 70° to 95° C., with air or oxygen, or electrochemically at an anode with a low oxygen overvoltage. Soft-textured reddish blue pigments I which have a very high color strength, are very readily dispersible and produce very brilliant colorations are obtained under these conditions.

The oxidation is preferably carried out at from 75° to 85° C. The air or oxygen is stirred into the suspension and is finely dispersed, or is injected via a spray nozzle. The oxidation can also be carried out in a column into which air or oxygen is injected in finely dispersed form at the bottom. The redox potential of the suspension is advantageously monitored during the oxidation of II to I in order to avoid peroxidation. The oxidation can be regarded as having ended when from 95 to 99% of the iron-II cyano compound has been oxidized to I, or 75% of the free $Fe^{2+}$ has been oxidized to $Fe^{3+}$.

It is particularly advantageous to carry out the oxidation electrochemically in a cell divided by a cation exchange membrane. In this case, a caustic alkali solution is recovered in the catholyte at the cathode, while a virtually salt-free blue pigment I is produced in the anolyte.

This pigment can be isolated and then dried directly, i.e. without being washed first. A titanium, tantalum or niobium anode which is doped with a platinum metal or a platinum oxide and has a low oxygen overvoltage is employed in this case.

When the process is carried out industrially, the iron-II complex does not have to be isolated, and can be oxidized directly in the electrolyte, and (I) is then isolated in a conventional manner.

If the oxidation is carried out with atmospheric oxygen or hydrogen peroxide or is effected electrochemically, the filtrate from (I) can be re-used as electrolyte, after the constituents consumed have been replaced.

Very fine-particled pigments I which are readily dispersible in water are obtained by oxidizing II with air or oxygen at pH>8 and at from 20° to 50° C. The process of oxidation can be followed by measuring the redox potential. When the oxidation has ended, the reaction mixture is acidified and the pigment is isolated. Its dispersibility in water is improved by adding a small amount (i.e. from 0.01 to 0.2% by weight, based on (I) of a polyol, e.g. diethylene glycol, triethylene glycol or glycerol) to the reaction mixture.

In the Examples which follow and which illustrate the invention, percentages are by weight and the yields of pigment are based on the simplified formula M Fe[Fe(CN)$_6$], where M is an alkali metal ion or ammonium ion.

EXAMPLE 1

(a) Electrolysis: A solution prepared by dissolving 90 g (3.33 moles) of HCN, 65 g (1.16 moles) of KOH and 294.5 g (1.06 moles) of FeSO$_4$.7H$_2$O in 3000 g of water was introduced, as the electrolyte, into the cathode chamber of an electrolysis cell which was equipped with a stainless steel cathode and a titanium/platinum anode (each of which were 1 dm$^2$) and in which the anode chamber and the cathode chamber were separated by an anion exchange membrane (a vinyl chloride/acrylonitrile copolymer containing quaternary ammonium groups as charge carriers; area 1.2 dm$^2$). The pH was 3.5.

The anode chamber was filled with 5% strength H$_2$SO$_4$, and electrolysis was then carried out for 180 minutes at a current strength of 20 A and at 35° C., the catholyte being circulated. After this period, the pH was 3.

(b) Working up: The catholyte was removed from the cell, and stirred for 1 hour at 100° C. The suspension was brought to pH 2 by the addition of dilute sulfuric acid, and the iron-II hexacyanoferrate-II in the suspension was oxidized at 80° C. with hydrogen peroxide until a violet hue was obtained.

The blue pigment was filtered off, washed, and dried in a through-circulation drier at 80° C.

98% of the HCN used was converted, and the yield of the blue pigment I was 172 g, corresponding to 99%, based on HCN converted (consumed).

In surface coatings, the blue pigment obtained gave purer and redder colorations of better gloss than blue pigments produced by prior art processes, in which an iron-II salt and potassium hexacyanoferrate-II are converted to Berlin white, which is then oxidized.

EXAMPLE 2

(a) In the electrolysis cell described in Example 1, the membrane was replaced by a cation exchange membrane (a tetrafluoroethylene/vinylsulfonyl fluoride copolymer in which the sulfonyl fluoride groups were hydrolyzed to sulfonic acid groups). The catholyte, which was circulated, was a solution of 80 g (2.96 moles) of HCN and 200 g (2.68 moles) of KCL in 2900 g of water, and the anolyte was 5% strength aqueous sulfuric acid. 8.52 g (0.73 mole) of iron-II carbonate and 12 g (0.21 mole) of 100% stength KOH were metered into the catholyte in the course of 20 minutes, at a current of 20 A. The pH of the electrolyte was 2.8. Electrolysis was terminated after 165 minutes. (b) The catholyte was worked up as described in Example (1b).

92% of the HCN used was converted, and the yield of the blue pigment I was 139 g, corresponding to 99%, based on HCN converted.

(c) The starting materials HCN and KCL were added, in amounts corresponding to those consumed, to the filtrate obtained according to (b) in the isolation of the blue pigment, so that the catholyte had the composition stated under (a). 85.2 g of iron-II carbonate and 12 g of KOH were then metered in over 20 minutes (pH=2.8), as described under (a), and the procedure was continued as described under (a) and (b). The yield of the blue pigment I was 104 g.

EXAMPLE 3

(a) In the electrolysis cell described in Example (2a), a solution of 37 g (1.37 moles) of HCN, 100 g (0.57 mole=1.14 g equivalent) of K$_2$SO$_4$ and 113 g (0.41 mole) of FeSo$_4$.7H$_2$O in 3000 g of water (pH=3.5) was employed as the catholyte, and electrolysis was carried out with 15 A and at 20° C. for 45 minutes. The anolyte was 5% strength sulfuric acid.

(b) The catholyte was worked up as described in Example (1b) to give the blue pigment I in a yield of 69 g.

In printing inks and surface coatings, the blue pigment obtained gave purer and redder colorations and prints than products obtained by prior art processes in which an iron-II salt and potassium hexacyanoferrate-II are converted to Berlin white, which is then oxidized.

(c) The constituents consumed were replaced in the filtrate obtained in the isolation of the pigment, this being achieved by the addition of HCN, iron-II carbonate and $K_2CO_3$ so that the amounts stated under (a) were reached, and the $Fe^{3+}$ formed from the excess iron was reduced with $SO_2$ to $Fe^{2+}$. The resulting solution (pH 3.2) was then electrolyzed as described under (a), and working up was carried out as described in Example (1b). The blue pigment isolated (70.5 g) had virtually the same coloristic properties as the pigment obtained according to (b).

EXAMPLE 4

(a) In the electrolysis cell described in Example 2a, a solution of 36 g (1.33 moles) of HCN, 10 g (0.06 mole = 0.12 g equivalent) of $K_2SO_4$ and 113 g (0.41 mole) of $FeSO_4.7H_2O$ in 2900 g of water (pH 3.1) was employed as the catholyte, and electrolysis was carried out with 15 A for 45 minutes. The pH of the catholyte was kept at 3 during electrolysis by the addition of 30 g of $K_2CO_3$.

(b) The catholyte was worked up as described in Example (1b), and the yield of blue pigment was 66 g. In surface coatings and printing inks, this pigment gave purer and redder colorations and prints of better gloss than the corresponding prior art pigments.

EXAMPLE 5

(a) In the electrolysis cell described in Example 1, a solution of 180 g (6.67 moles) of HCN, 589 g (2.12 moles) of $FeSO_4.7H_2O$ and 130 g (2.32 moles) of 100% strength KOH in 2800 g of water (pH=2.9) was employed as the catholyte, and the anolyte was 5% strength $H_2SO_4$. Electrolysis was carried out with 30 A and at 35° C. for 280 minutes, and the catholyte was circulated.

(b) The catholyte was worked up as described in Example (1b), and the yield of pigment was 366 g. In surface coatings and printing inks, this pigment gave purer and redder colorations and prints of better gloss than the corresponding prior art blue pigments. $\approx 98\%$ of the HCN used was converted, and the yield of pigment was $\approx 99\%$, based on HCN converted.

EXAMPLE 6

(a) In the electrolysis cell described in Example 1, a solution of 120 g (4.44 moles) of HCN, 392.6 g (1.41 moles) of $FeSO_4.7H_2O$, 44 g (1.1 moles) of 100% strength NaOH and 44 g (2.59 moles) of $NH_3$ in 2800 g of water (pH 3.1) was employed as the catholyte, and the anolyte was 5% strength $H_2SO_4$. Electrolysis was carried out with 25 A and at 30° C. for 180 minutes, and the catholyte was circulated.

(b) Working up was carried out as described in Example (1b), and the yield of blue pigment was 201 g. This pigment corresponds in its coloristic properties to the prior art pigments. $\approx 90\%$ of the HCN used was converted, and the yield of pigment was $\approx 99\%$, based on HCN converted.

EXAMPLE 7

(a) In the electrolysis cell described in Example 1, a solution of 90 g (3.33 moles) of HCN, 82 g (0.5 mole = 1.0 g equivalent) of $(NH_4)_2SO_4$ and 294.5 g (1.06 moles) of $FeSO_4.7H_2O$ in 2800 g of water (pH 2.7) was employed as the catholyte, and the anolyte was 5% strength $H_2SO_4$. Electrolysis was carried out with 30 A and at 40° C. for 130 minutes and the catholyte was circulated.

(b) The catholyte was worked up as described in Example (1b), and 152 g of a very fine-particled blue pigment were obtained. $\approx 90\%$ of the HCN used was converted, and the yield of pigment was $\approx 99\%$, based on HCN converted.

EXAMPLE 8

(a) Preparation of the aqueous suspension of iron-II hexacyanoferrate-II was carried out as described in Example (1a).

(b) For working up, the suspension obtained according to (a) was introduced into the anode chamber of the electrolysis cell described in Example (2a). The catholyte was 15% strength aqueous potassium hydroxide solution. The hexacyanoferrate-II was oxidized at 70° C. and at a current strength of 5 A, until a reddish hue was observed.

The blue pigment I was filtered off, and dried without being washed, and the yield was 168 g. In surface coatings and printing inks, this pigment gave purer and redder colorations of better gloss than the blue pigments obtained by prior art processes.

EXAMPLE 9

(a) The electrolysis cell described in Example (1a) was used, except that it was equipped with a titanium/platinum metal anode with an oxygen overvoltage of 750 mv.

The catholyte was a solution of 240 g (8.89 moles) of HCN, 783.5 g (2.82 moles) of $FeSO_4.7H_2O$ and 173 g (3.09 moles) of 100% strength KOH in 2800 g of water (with a pH of 3.1), and the anolyte was a 2.5% strength solution of $Na_2SO_4$, containing 0.05% of $Na_2F_2$. Electrolysis was carried out at a current strength of 30 A and at 35° C. for 360 minutes, and the catholyte and anolyte were circulated. When electrolysis was complete, the catholyte had a pH of 3.0.

The pH of the anolyte was kept at 5.5 by metering in sodium hydroxide solution, and in this manner the amount of sodium hydroxide solution required for the formation of the peroxydisulfate was supplied. (b) The catholyte was worked up as described in Example (1b), and the yield of the blue pigment I was 437 g. In surface coatings and printing inks, this pigment gave purer and redder colorations and prints of better gloss than the corresponding prior art blue pigments. $\approx 96\%$ of the HCN used was converted, and the yield of pigment was $\approx 99\%$, based on HCN converted.

EXAMPLE 10

(a) In the electrolysis cell described in Example 9, a solution of 357.4 g (2.82 moles) of $FeCl_2$, 240 g (8.89 moles) of HCN and 173 g (3.09 moles) of 100% strength KOH in 2800 g of water (pH=2.8) was employed as the catholyte, and the anolyte was an aqueous 3% strength NaCl solution (pH 5.5). Electrolysis was carried out at a current strength of 30 A and at 50° C. for 360 minutes, and the liquids were circulated during this procedure. When the electrolysis was complete, the catholyte had a pH of 3.2.

The pH of the anolyte, initially 5.5, was kept constant during electrolysis by the addition of sodium hydroxide solution, so that the chlorate was formed.

(b) The catholyte was worked up as described in Example (1b), and the yield of the blue pigment I was 440 g. In surfce coatings and printing inks, this pigment gave purer and redder colorations of better gloss than the corresponding prior art blue pigments. ≈97% of the HCN used was converted, and the yield of pigment was ≈99% based on HCN converted.

We claim:

1. A process for the production of a blue iron hexacyanoferrate-III pigment, wherein iron-II hexacyanoferrate-II (Berlin white) is prepared, in an electrolysis cell whose anode chamber and cathode chamber are separated by an ion exchange membrane, by electrolysis of an aqueous solution containing (a) an iron-II salt, (b) an alkali metal salt, an ammonium salt or a mixture of these, and (c) hydrogen cyanide, at a pH of from 0.5 to 6, as catholyte in the cathode chamber, and of an electrically conductive, aqueous solution in the anode chamber, the iron-II hexacyanoferrate-II is oxidized to the iron hexacyanoferrate-III pigment, and the latter is isolated.

2. A process as claimed in claim 1, wherein the catholyte has a pH of from 2 to 4.

3. A process as claimed in claim 2, wherein not less than 1 equivalent of (b) and not less than 6 moles of (c) are used per 2 moles of (a) in the catholyte.

4. A process as claimed in claim 3, wherein the catholyte contains (a) and (b) in the form of the sulfates, hydrogen sulfates or chlorides, or mixtures of these.

5. A process as claimed in claim 4, wherein the electrolysis is carried out at from 20° to 60° C.

6. A process as claimed in claim 6, wherein (b) is present in the form of one or more sodium or potassium salts or of a mixture thereof.

7. A process as claimed in claim 6, wherein the electrolysis is carried out at from 20° to 60° C.

8. A process as claimed in claim 7, wherein the complex iron-II hexacyanoferrate-II is oxidized with air or oxygen, at pH>8 and at from 20° to 50° C.

9. A process as claimed in claim 6, wherein the oxidation of the complex iron-II hexacyanoferrate-II is carried out with air, oxygen, hydrogen peroxide or a peroxydisulfate, or is effected electrochemically, at from 20° to 95° C. and at a pH of from 0 to 4, preferably from 0 to 2.5.

10. A process as claimed in claim 6, wherein the electrolysis is carried out at from 20° to 60° C.

11. A process as claimed in claim 1, wherein not less than 1 equivalent of (b) and not less than 6 moles of (c) are used per 2 moles of (a) in the catholyte.

12. A process as claimed in claim 1, wherein the catholyte contains (a) and (b) in the form of the sulfates, hydrogen sulfates, or chlorides, or mixtures of these.

13. A process as claimed in claim 12, wherein (b) is present in the form of one or more sodium or potassium salts or of a mixture thereof.

14. A process as claimed in claim 1, wherein (b) is present in the form of one or more sodium salts, one or more potassium salts, or mixtures thereof.

15. A process as claimed in claim 1, wherein the electrolysis is carried out at from 20° to 60° C.

16. A process as claimed in claim 1, wherein electrolysis of the catholyte is carried out continuously.

17. A process as claimed in claim 1, wherein the oxidation of the complex iron-II hexacyanoferrate-II is carried out with air, oxygen, a chlorate, chlorine, hydrogen peroxide or a peroxydisulfate, or is effected electrochemically, at from 20° to 95° C. and at a pH from 0 to 4, preferably from 0 to 2.5.

18. A process as claimed in claim 1, wherein the complex iron-II hexacyanoferrate-II is oxidized with air or oxygen, at pH>8 and at from 20° to 50° C.

19. A process for the preparation of a blue iron hexacyanoferrate-III pigment, wherein iron-II hexacyanoferrate-II (Berlin white) is prepared, in an electrolysis cell whose anode chamber and cathode chamber are separated by an ion exchange membrane, by electrolysis of an aqueous solution containing (a) an iron-II salt, (b) a sodium, potassium or ammonium salt, or a mixture of these, and (c) hydrogen cyanide, in a ratio corresponding to 1.3–2.5 equivalents of (b) and 6.1–7.5 moles of (c) per 2 moles of (a), at a pH of from 2 to 4 as catholyte in the cathode chamber, and of an electrically conductive, aqueous solution in the anode chamber, the resulting complex iron-II hexacyanoferrate-II is oxidized to the iron hexacyanoferate-III pigment, and the latter is isolated.

* * * * *